D. W. FRANK.
COMBINATION BROOM.
APPLICATION FILED JAN. 29, 1920.
1,424,291.
Patented Aug. 1, 1922.
2 SHEETS—SHEET 1.
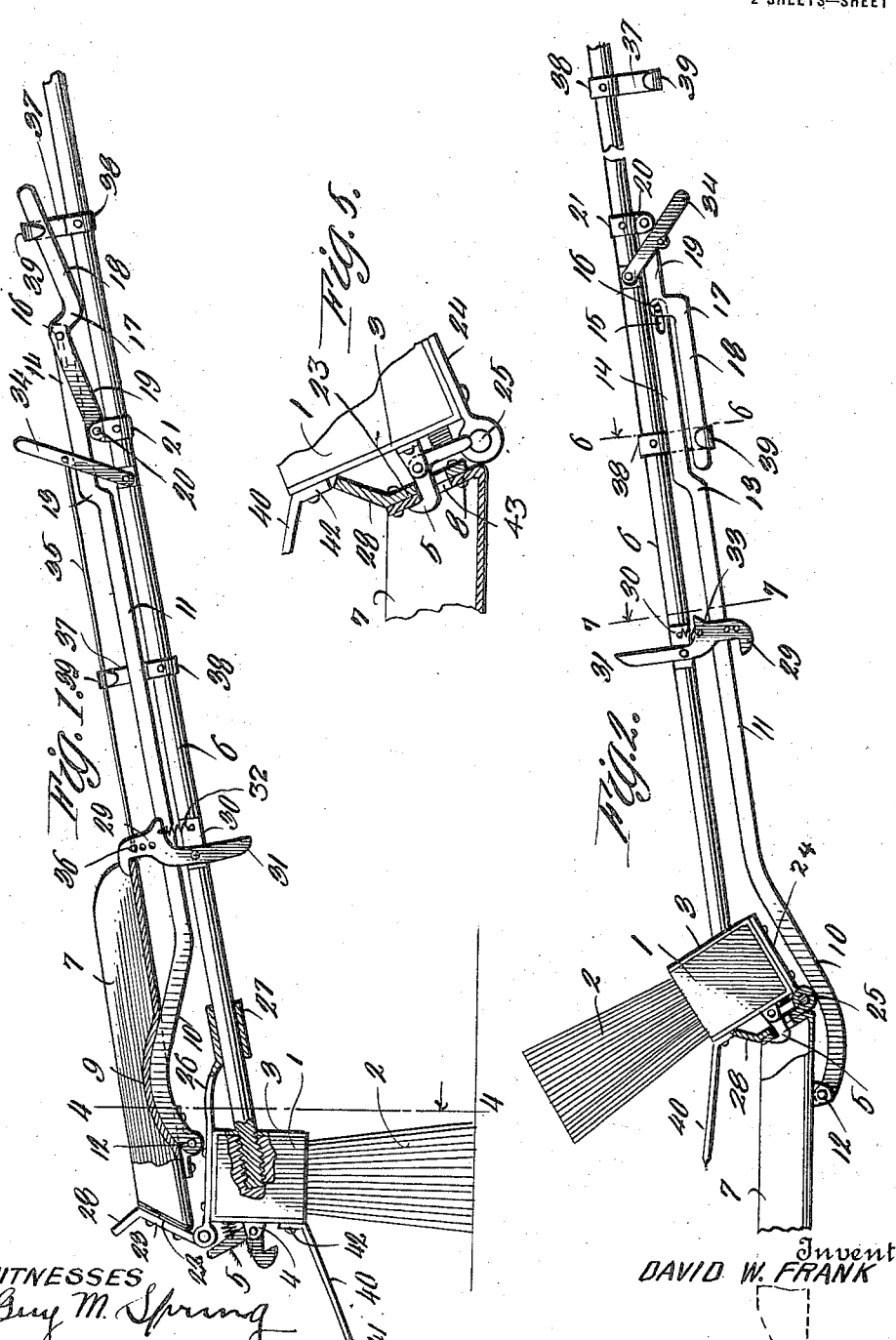
WITNESSES
Guy M. Spring
Frank D. O'Connell
Inventor
DAVID W. FRANK
By Richard B. Owen
Attorney D. W. FRANK.
COMBINATION BROOM.
APPLICATION FILED JAN. 29, 1920.
1,424,291.
Patented Aug. 1, 1922.
2 SHEETS—SHEET 2.
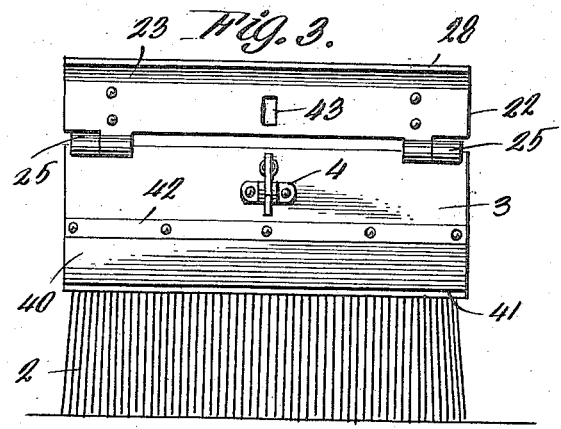
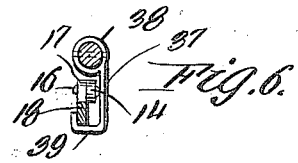
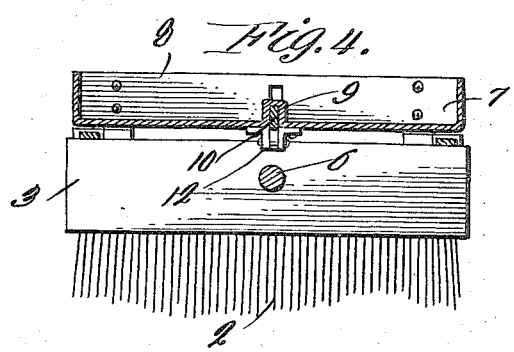
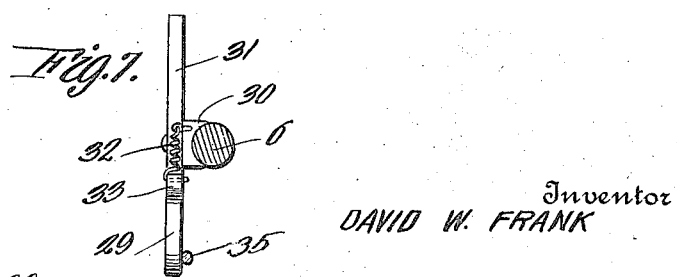
WITNESSES
Guy M. Spring
Frank D. O'Connell
Inventor
DAVID W. FRANK
By Richard B. Owen
Attorney

UNITED STATES PATENT OFFICE.

DAVID WALTER FRANK, OF BETHLEHEM, PENNSYLVANIA.

COMBINATION BROOM.

1,424,291.  Specification of Letters Patent.  Patented Aug. 1, 1922.

Application filed January 29, 1920. Serial No. 354,997.

*To all whom it may concern:*

Be it known that I, DAVID W. FRANK, a citizen of the United States, residing at Bethlehem, in the county of Lehigh and State of Pennsylvania, have invented certain new and useful Improvements in Combination Brooms, of which the following is a specification.

The primary object of this invention is to provide a new and useful implement from the combination of various other implements into a unified structure, so that the user may more conveniently and efficiently avail himself of the separate or joint use of any of the implements so combined.

Another object of this invention is to provide a combination implement of the character described including a broom, a shovel, a scraper, and an ice digger; means being associated with the implement handle, whereby certain of the constituent elements of the combination may be relatively adjusted to an operative or inoperative position.

The invention further contemplates the arrangement or association of the several combined implements above referred to so that the scraper element constitutes a hinged connecting link between the shovel and brush element respectively, while the digger element provides an advanced guard or shield for the brush and shovel, when either is in use.

With the above and other objects in view, the invention resides in the details of construction, combinations and arrangements of parts as are hereinafter more fully described and pointed out, reference being had to the several views of the accompanying drawings, wherein Figure 1 is an elevation of my improved implement when used as a broom;

Fig. 2, an elevation showing the implement reversed to illustrate its use as a shovel;

Fig. 3, a front view of the brush head illustrating the ice digger and hinged scraper, Fig. 4, a vertical cross-section on line 4—4 of Fig. 1;

Fig. 5, a fragmentary detail showing the manner in which the shovel is locked to the brush head;

Fig. 6, a vertical cross-section on the line 6—6 of Fig. 2; and

Fig. 7, a vertical cross-section taken on the line 7—7 of Fig. 2.

In the drawings, 1 indicates a brush head carrying the usual bristles 2 and further provided in this instance with a protective casing 3 enclosing a brush head on three sides and provided on its foremost side with a bearing block 4 to which is pivoted a suitable spring-pressed catch-lever 5. An elongated handle 6 is secured to the broom head 1 as illustrated, one end of the handle being screw-threaded for engagement with a correspondingly threaded recess in the broom head, although it is obvious that other and appropriate methods of attaching the handle may be employed.

Combined with the broom above described is a shovel 7 having the inclined back wall 8 and the raised bottom portion 9 in which is accommodated the end 10 of the lift-lever 11 thus forming an abutment means to hold the shovel in an inoperative position. The lift-lever 11 extends longitudinally of the broom handle 6 with its arched end 10 pivotally connected to the under side of the shovel as indicated at 12; the other end of the lever being bent, as at 13 to provide an offset portion 14, having its end slotted as at 15 to slidably accommodate the pivot pin 16 of a hand-lever 17. The lever 17 comprises the oppositely extending offset arms 18 and 19 respectively, the former constituting a handgrip and the latter being fulcrumed at 20 to the ear-pieces of the handle-encircling band 21.

As a connecting link between the shovel 7 and the broom 1, a scraper element 22 is provided and consists of wing portions 23 and 24 respectively hinged together as at 25. The wing 24 of the hinge is bolted to the top of the broom head 1 and is provided with a rearwardly extension 26 which carries a sleeve 27 for encircling and supporting the broom handle 6. The wing 23 is bolted to the rear inclined wall 8 of the shovel 7 and is provided with an extension 28 inclined oppositely to the shovel wall 8 and providing the scraper attachment for use in the manner hereinafter explained.

As illustrated in Fig. 1, the shovel is supported in an inoperative position above the broom head 1 which is hingedly connected to the rear shovel end, the latter projecting slightly beyond the forward face of the broom while its open end projects rearwardly above the handle 6 and is engaged by the catch 29. This catch is illustrated in Figs. 1, 2, and 7 of the accompanying drawings and is pivoted to the side block 30 carried by handle 6 and is further provided with an elongated depending shank 31 by which the catch may be manually operated if desired. The catch is normally forced into locking position by means of a spring 32 which has one end secured to the block 30 and the other end fastened to a finger 33 formed rearwardly of the catch 29. The catch is normally controlled by the lever 34 pivoted to the handle 6 and connected to the catch by means of a connecting wire 35 which may be attached to any of the catch openings 36. Should it be desirable the lever 34 and wire 35 may be dispensed with and the catch merely manually operated by means of its shank 31. Permanently attached to the handle 6 at suitable points are a pair of lever holders 37, each comprising a handle gripping band 38 and a hook bearing portion 39 which is adapted to engage over the hand gripping portion 18 of the lever 17 so as to prevent the lever from flopping around during use of the device.

In addition to the above there is also provided a digger attachment particularly adapted for the chopping up or breaking of ice and consisting of a blade 40 having a sharpened edge 41 and the inclined rearward flange 42 by means of which it is bolted to the casing 3 of the brush head, below the catch block 5. The digger 40 extends forwardly of the broom head in substantially a straight line with the handle 6 so as to stand clear of both the shovel 7 and the bristles 2 when the tool is in a vertical position, thus permitting unhampered use of the digger while the implement is so positioned. The shovel 7, during the use of the digger, is folded back upon the top of the broom head as illustrated in Fig. 1 of the drawings and is held in place by catch 29. By bringing the tool to a horizontal position it may conveniently be used as a street brush, the digger being elevated out of contact with the ground and by reason of its inclined position projecting forwardly of the brush bristles 2 so as to provide an advance shield or guard for the broom, and is particularly useful when used for street cleaning purposes or where any hard or lumpy matter is encountered, as the digger, by reason of its advanced position, may be caused to penetrate any accumulated pile of such lumpy substance and to separate the same so that the resistance of the pile to the brushing force of the bristles is materially lessened.

In order to utilize the shovel feature of the implement, the catch 29 is released by means of handle 34, after which the lever 17 is freed from the grasp of holder 37 and moved upwardly to raise the link bar 11. The raising of the link bar causes the shovel 7 to be thrown forwardly about the end until the extension 28 abuts the brush head casing 3 with its edge adjacent to the edge of the digger flange 42. The head of the catch 5 passes through an opening 43 cut through the bolted members 23 and 8 respectively, and locks the shovel in operative position. Upon forcing the free end of hand grip 18 under the hook portion of the other holder 37 the link bar 11 and lever 17 are prevented from wabbling; and upon reversing the tool so that the broom is uppermost the shovel is brought into operative position with the digger 40 projecting between the shovel and broom and uniting with the digger extension so as to form an overhanging and rear wall for the shovel which will prevent any excess of the dirt or other material gathered by the shovel from mingling with the bristles of the broom or the shovel locking mechanism.

Upon reversing the lever 17 so that the shovel is thrown into inoperative position, as illustrated in Fig. 1, the scraper extension 28 is exposed and may be utilized merely by the inverting of the tool so that the bristles are uppermost. It is thus evident that while the shovel is in inoperative position the broom 2, the digger 40, and the scraper 28 are each exposed and available for use, merely by turning the handle so as to bring the selected implement into proper position, and as has been explained, all of the implements are so arranged and proportioned as to modify or in some instances enlarge the usefulness of each implement as it is brought into use, and all jointly contribute to provide a single structure adapted for different and various uses. Although the foregoing description and accompanying drawings may be considered as having reference to the preferred or approved form of the invention, it is to be understood that such changes in the construction, combination, and arrangement of parts may be resorted to as are deemed expedient and are permissible within the scope of the appended claims.

What I claim as new and desire to secure by Letters Patent is:—

1. A device of the character described including a head, a shovel, a scraper hingedly connecting the shovel to the head, and a digger projecting from the broom head to provide an abutment for the scraper.

2. A device of the character described including a head, a handle therefor, a shovel, a hinge connection between the shovel and head, said hinge having one portion fixed to the shovel, the other portion being fixed to the head, means for moving said shovel about the hinge into operative or inoperative position, and an extension on the shovel-carried hinge portion to provide a scraper attachment when the shovel is in an inoperative position and to provide bracing abutment means between the shovel and head when the former is brought into operative position.

3. A device of the character described including a head, a scraper hinged forwardly of one side of the head, a shovel carried by said scraper between the hinged end and the scraper end and normally positioned to project rearwardly over said head, a digger fixed to said head below the scraper and projecting outwardly therefrom, means for moving said shovel and scraper about the head so that when the device is inverted the shovel projects forwardly of said head beneath said digger, said scraper abutting said digger to limit the movement of said shovel and acting jointly to said digger to provide an overhanging rear guard flange for said shovel, and catch means carried by said head and engaging said scraper for retaining the shovel in its adjusted position.

4. A device of the character described including a head, a handle therefor, a shovel normally disposed across the top of said head, a hinge connecting the rear end of said shovel to said head, a catch on said handle for releasably engaging the shovel, means on said handle for raising said shovel off said head and projecting it forwardly thereof, stop means carried by said shovel for abutment with the head whereby the shovel may be held projected at an angle from said head, and catch means on said head for holding the shovel in its projected position whereby said shovel may be brought into operative position upon inverting the position of said device.

5. A device of the character described including a head, a handle therefor, a shovel pivotally connected to said head, a lever on said handle, a lift-bar pivoted at one end to the shovel and at the other end to said lever, and different abutment means for retaining the shovel one in an operative position and the other in an inoperative position.

6. A device of the character described including a head, a handle therefor, a shovel pivotally connected to said head, a lever on said handle and a lift-bar pivoted at one end to the shovel and at the other end to said lever.

In testimony whereof I affix my signature in presence of two witnesses.

DAVID WALTER FRANK.

Witnesses:
R. B. KLOK, M. D.,
C. K. MIDDAUGH.